(12) United States Patent
Sun

(10) Patent No.: US 12,219,921 B2
(45) Date of Patent: Feb. 11, 2025

(54) HIGH-RELIABILITY FLIGHT CASE WITH AUXILIARY LOCKING FUNCTION

(71) Applicant: Tangshan Jichangbao Pet Products Co., Ltd, Tangshan (CN)

(72) Inventor: Yanan Sun, Tangshan (CN)

(73) Assignee: Tangshan Jichangbao Pet Products Co., Ltd, Tangshan (CN)

( * ) Notice: Subject to any disclaimer, the term of this patent is extended or adjusted under 35 U.S.C. 154(b) by 171 days.

(21) Appl. No.: 18/193,672

(22) Filed: Mar. 31, 2023

(65) Prior Publication Data

US 2023/0371468 A1 Nov. 23, 2023

(30) Foreign Application Priority Data

May 23, 2022 (CN) .......................... 202210561075.1
May 23, 2022 (CN) .......................... 202221237378.X

(51) Int. Cl.
| | | |
|---|---|---|
| *A01K 1/02* | (2006.01) | |
| *B65D 45/30* | (2006.01) | |
| *B65D 55/02* | (2006.01) | |
| *B65D 85/50* | (2006.01) | |

(52) U.S. Cl.
CPC ............ *A01K 1/0245* (2013.01); *B65D 45/30* (2013.01); *B65D 55/02* (2013.01); *B65D 85/50* (2013.01)

(58) Field of Classification Search
CPC .... A01K 1/0245; A01K 1/0236; B65D 45/30; B65D 55/02; B65D 85/50
See application file for complete search history.

(56) References Cited

U.S. PATENT DOCUMENTS

| | | | | |
|---|---|---|---|---|
| 5,253,612 A | * | 10/1993 | Goetz ................. | A01K 1/0245 119/497 |
| 6,182,611 B1 | * | 2/2001 | Marchioro .......... | A01K 1/0245 D30/114 |
| 6,571,740 B1 | * | 6/2003 | Kinder ................. | A01K 1/0245 119/497 |
| 6,647,925 B1 | * | 11/2003 | Waiters ............... | A01K 1/0245 119/497 |
| 8,336,500 B1 | * | 12/2012 | Britt .................... | A01K 1/0107 119/497 |
| 2009/0050069 A1 | * | 2/2009 | Hurwitz .............. | A01K 1/0245 119/500 |

FOREIGN PATENT DOCUMENTS

| | | | |
|---|---|---|---|
| CN | 207870002 U | | 9/2018 |
| CN | 208665966 U | | 3/2019 |
| CN | 115119757 A | | 9/2022 |
| CN | 117256489 A | * | 12/2023 |

OTHER PUBLICATIONS

Container type nursing house for transporting pig (Year: 2023).*

* cited by examiner

*Primary Examiner* — Yvonne R Abbott-Lewis

(57) ABSTRACT

Disclosed is a high-reliability flight case with an auxiliary locking function, comprising a case body and a case door located at an opening of the case body, an outer wall of the case door is fixedly connected with an iron shaft, the outer wall of the case door is fixedly connected with a box body, the box body is symmetrically connected with two inserting rods through a rebound mechanism, connecting seats are integrally formed at positions corresponding to ends of the iron shaft and ends of the inserting rods on an outer wall of an opening of the case body, and inserting holes matched with the iron shaft and the inserting rods are formed in the connecting seats in a penetrating mode.

5 Claims, 4 Drawing Sheets

HIGH-RELIABILITY FLIGHT CASE WITH AUXILIARY LOCKING FUNCTION

CROSS REFERENCE TO RELATED APPLICATIONS

This application claims foreign priority of Chinese Patent Application No. 202210561075.1 with a filing date of May 23, 2022, Chinese Patent Application No. 202221237378.X with a filing date of May 23, 2022. The disclosures of all of which are hereby incorporated by reference.

TECHNICAL FIELD

The present invention relates to a pet flight case, and particularly to a high-reliability flight case with an auxiliary locking function.

BACKGROUND OF THE PRESENT INVENTION

At present, a general locking mode of conventional pet flight cases is to insert two inserting rods moving up and down into corresponding inserting holes in a case body to realize locking. This mode is simple and direct, but has weak firmness and needs to be improved during transportation of animals or pets.

SUMMARY OF PRESENT INVENTION

The present invention aims to provide a high-reliability flight case with an auxiliary locking function, so as to solve the problems in the background above.

In order to achieve the object above, the present invention provides the following technical solution.

A high-reliability flight case with an auxiliary locking function comprises a case body and a case door located at an opening of the case body, an outer wall of the case door is fixedly connected with an iron shaft, the outer wall of the case door is fixedly connected with a box body, the box body is symmetrically connected with two inserting rods through a rebound mechanism, connecting seats are integrally formed at positions corresponding to ends of the iron shaft and ends of the inserting rods on an outer wall of an opening of the case body, inserting holes matched with the iron shaft and the inserting rods are formed in the connecting seats in a penetrating mode, one end of the inserting hole oriented to the case door is set as a conical flareout, an outer wall of the connecting seat is clamped with an adapter seat, a hand-screwed nut is movably arranged on the adapter seat in a penetrating mode, two ends of the iron shaft and one ends of the inserting rods far away from the box body are all provided with an external thread, and the threaded ends of the iron shaft and the inserting rods are located in corresponding connecting seats and matched with the hand-screwed nuts.

As a further solution of the present invention, the rebound mechanism comprises a spring located in the box body, two ends of the spring are both provided with a connecting plate, and one end of the inserting rod penetrates through the outer wall of the box body to be fixedly connected with corresponding connecting plate.

As a further solution of the present invention, an outer wall of the inserting rod close to the box body is bent to form a protrusion, the outer wall of the inserting rod is slidably sleeved with a guide sleeve, and the guide sleeve is fixedly connected with the case door.

As a further solution of the present invention, an outer wall of the adapter seat is provided with a plurality of buckles, and matched clamping grooves are arranged at positions on the outer wall of the connecting seat corresponding to the buckles.

As a further solution of the present invention, a conical boss is integrally formed on an outer wall of one end of the hand-screwed nut located in the adapter seat, a through hole matched with the hand-screwed nut is formed in the adapter seat, and an outer diameter of the conical boss close to an end with the through hole is larger than an aperture of the through hole.

Compared with the prior art, the present invention has the following beneficial effects:

1. According to the flight case, when the flight case is used for transporting pets, the hand-screwed bolts are rotated to be matched with the threaded ends of corresponding iron shaft or inserting rods to lock the iron shaft and the inserting rods, so that a stability of connection between the case door and the case body is effectively improved, the case door is avoided from being automatically opened during transportation, operation is easy and convenient, and when the hand-screwed bolts are not tightened, the inserting rods are operated through the protrusions to realize quick opening and closing of the case door.
2. According to the flight case, the inserting hole with the conical flareout in the connecting seat can guide the end of the inserting rod during insertion of the inserting rod, so that it is more convenient to insert the inserting rod into corresponding inserting hole.

Figure 1:
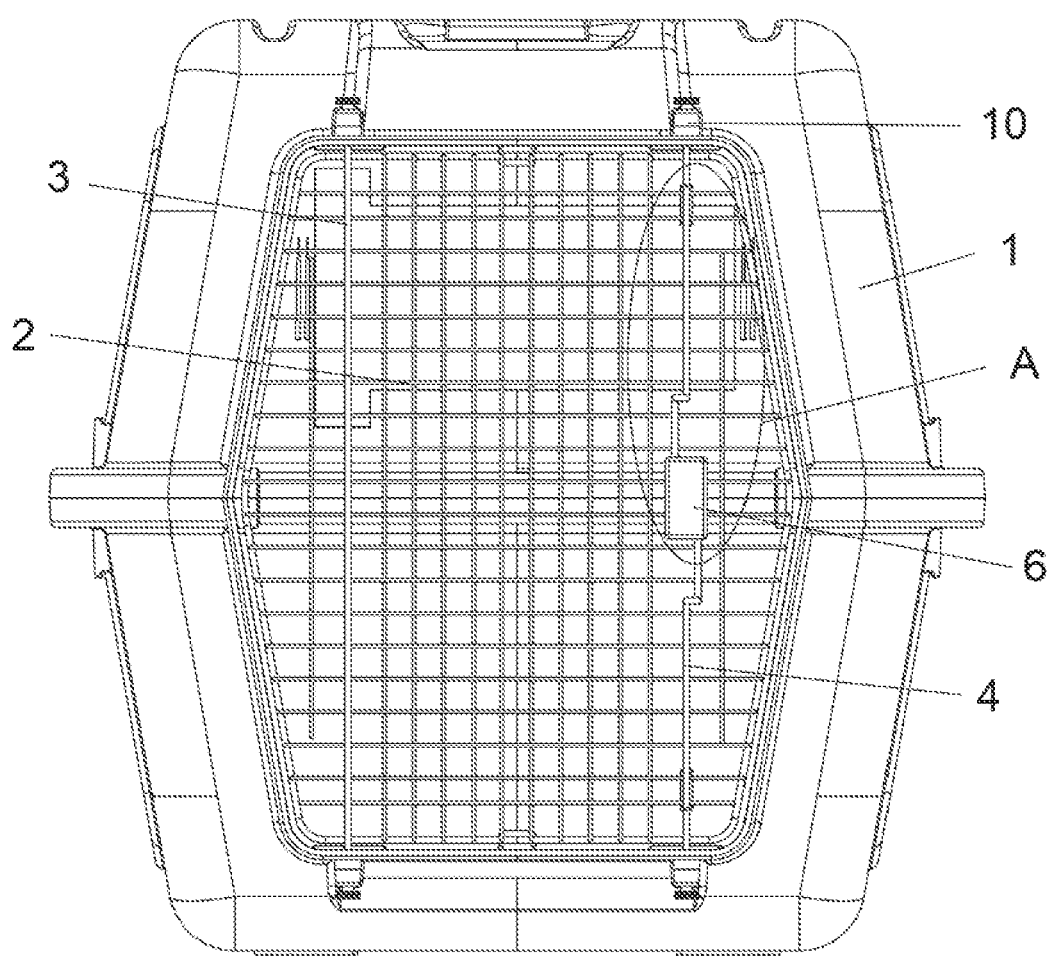
FIG. 1 is a schematic structural diagram of a high-reliability flight case with an auxiliary locking function.

In the drawings, 1 refers to case body, 2 refers to case door, 3 refers to iron shaft, 4 refers to inserting rod, 5 refers to protrusion, 6 refers to box body, 7 refers to connecting plate, 8 refers to spring, 9 refers to guide sleeve, 10 refers to connecting seat, 11 refers to adapter seat, 12 refers to buckle, and 13 refers to hand-screwed nut.

DETAILED DESCRIPTION OF PREFERRED EMBODIMENTS

To make the technical problems to be solved in the present invention, the technical solution and the beneficial effects clearer, the present invention is further described in detail hereinafter with reference to embodiments. It should be understood that specific embodiments described herein are only used for explaining the present invention and are not intended to limit the present invention.

It should be noted that when an element is expressed to be "fixed" or "arranged" on another element, it may be directly or indirectly on another element. When one element is referred to being "connected" to another element, it may be directly or indirectly connected to another element.

It should be understood that the orientation or position relationship indicated by the terms "up", "down", "front", "rear", "left", "right", "vertical", "horizontal", "top", "bottom", "inside", "outside", and the like is based on the orientation or position relationship shown in the drawings, it is only for the convenience of description of the present invention and simplification of the description, and it is not to indicate or imply that the indicated device or element must have a specific orientation in the specification, and be constructed and operated in a specific orientation. Therefore, the terms should not be understood as limiting the present invention.

Moreover, the terms "first", "second" and "third" are only used for descriptive purposes, but cannot be understood as indicating or implying relative importance, or implicitly indicating the number of indicated technical features. Therefore, the feature defined by "first" and "second" may explicitly or implicitly include one or more of the features.

Figure 2:
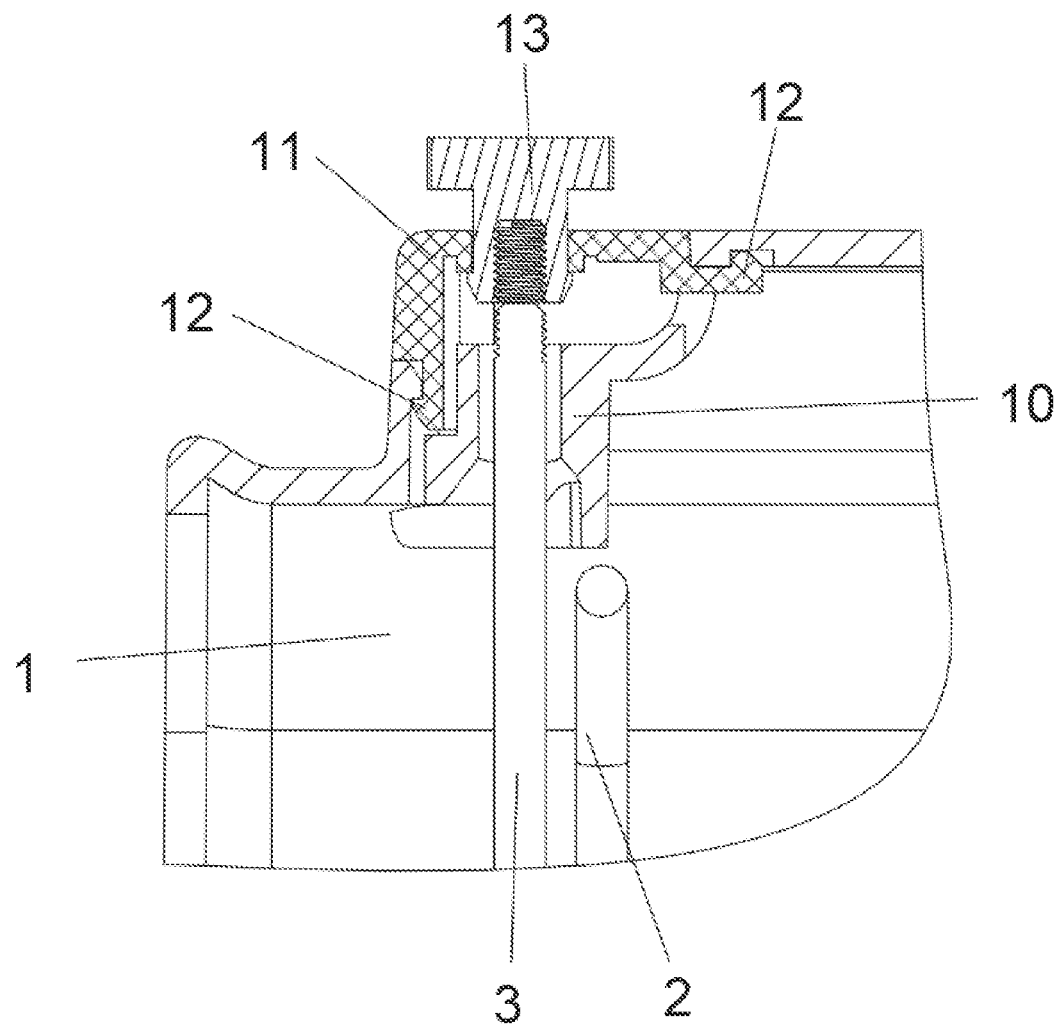
FIG. 2 is a schematic diagram of a sectional structure at a connecting seat in the high-reliability flight case with the auxiliary locking function.
Figure 3:
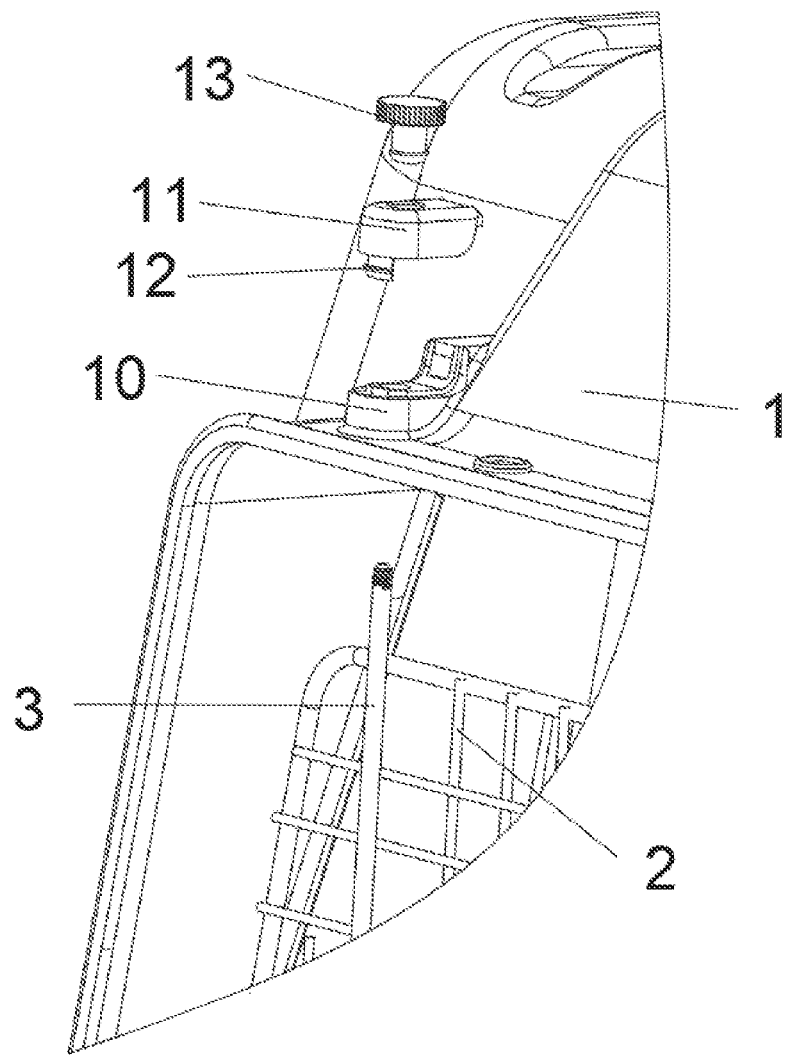
FIG. 3 is a locally exploded view in the high-reliability flight case with the auxiliary locking function.
Figure 4:
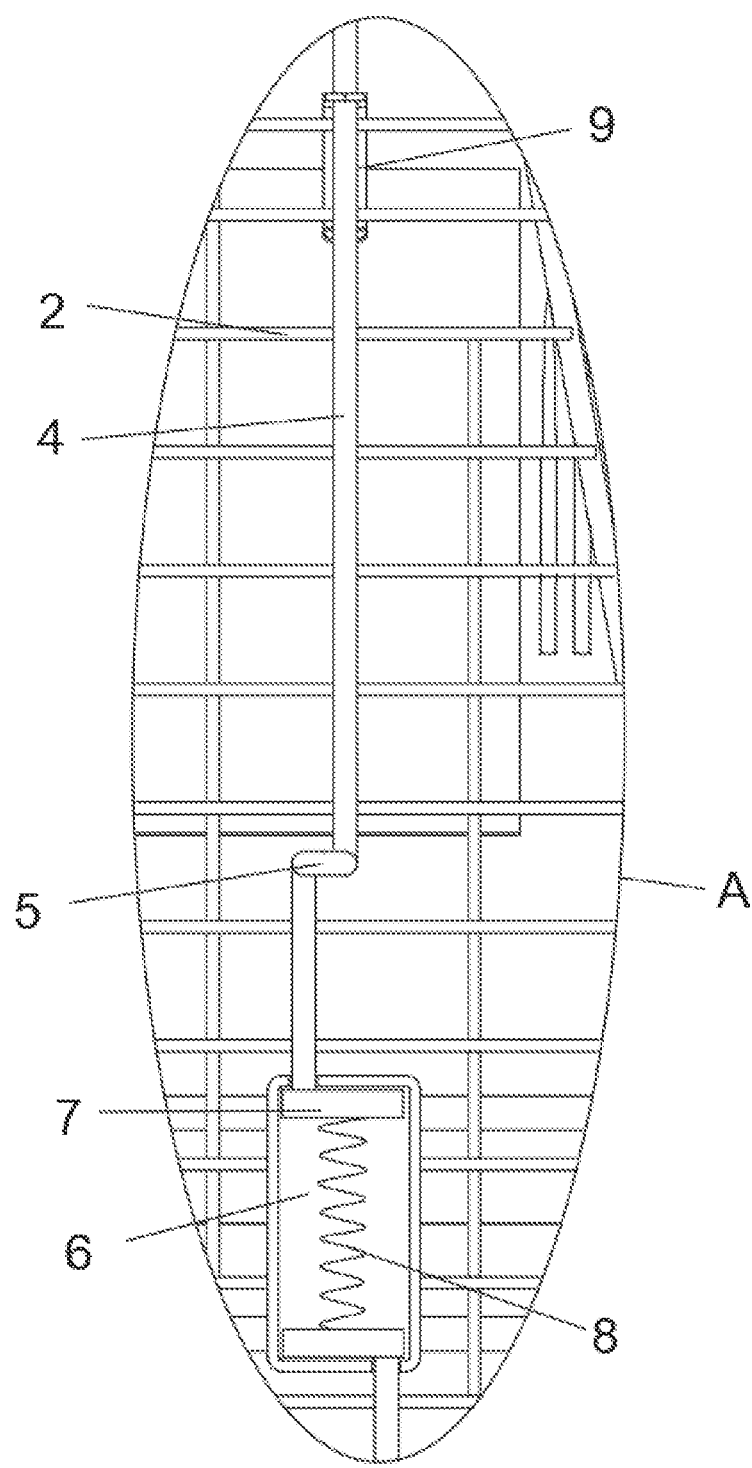
FIG. 4 is an enlarged view of a part A in FIG. 1.

With reference to FIG. 1 to FIG. 4, in an embodiment of the present invention, a high-reliability flight case with an auxiliary locking function comprises a case body 1 and a case door 2 located at an opening of the case body 1, an outer wall of the case door 2 is fixedly connected with an iron shaft 3, the outer wall of the case door 2 is fixedly connected with a box body 6, the box body 6 is symmetrically connected with two inserting rods 4 through a rebound mechanism, connecting seats 10 are integrally formed at positions corresponding to ends of the iron shaft 3 and ends of the inserting rods 4 on an outer wall of an opening of the case body 1, inserting holes matched with the iron shaft 3 and the inserting rods 4 are formed in the connecting seats 10 in a penetrating mode, one end of the inserting hole oriented to the case door 2 is set as a conical flareout, an outer wall of the connecting seat 10 is clamped with an adapter seat 11, a hand-screwed nut 13 is movably arranged on the adapter seat 11 in a penetrating mode, two ends of the iron shaft 3 and one ends of the inserting rods 4 far away from the box body 6 are all provided with an external thread, and the threaded ends of the iron shaft 3 and the inserting rods 4 are located in corresponding connecting seats 10 and matched with the hand-screwed nuts 13.

The rebound mechanism comprises a spring 8 located in the box body 6, two ends of the spring 8 are both provided with a connecting plate 7, and one end of the inserting rod 4 penetrates through the outer wall of the box body 6 to be fixedly connected with corresponding connecting plate 7.

The spring 8 is matched with two connecting plates 7, so that two inserting rods 4 can be pushed by the spring 8 at the same time.

An outer wall of the inserting rod 4 close to the box body 6 is bent to form a protrusion 5, the outer wall of the inserting rod 4 is slidably sleeved with a guide sleeve 9, and the guide sleeve 9 is fixedly connected with the case door 2.

The protrusion 5 is arranged, which is convenient to operate the inserting rod 4, and the guide sleeve 9 can keep the inserting rod 4 and improve a stability of the inserting rod 4 during moving at the same time.

An outer wall of the adapter seat 11 is provided with a plurality of buckles 12, and matched clamping grooves are arranged at positions on the outer wall of the connecting seat 10 corresponding to the buckles 12.

The buckle 12 is matched with the clamping groove, which is convenient to assemble the adapter seat 11 on the connecting seat 10.

A conical boss is integrally formed on an outer wall of one end of the hand-screwed nut 13 located in the adapter seat 11, a through hole matched with the hand-screwed nut 13 is formed in the adapter seat 11, and an outer diameter of the conical boss close to an end with the through hole is larger than an aperture of the through hole. In order to be convenient to insert the conical hand-screwed bolt 13 into corresponding through hole during assembling, the hand-screwed bolt 13 and the adapter seat 11 are both made of a plastic material with certain elasticity.

The conical boss is arranged, so that the hand-screwed bolt 13 can be limited on the adapter seat 11, thus avoiding the hand-screwed bolt 13 from falling off the adapter seat 11.

A working principle of the present invention is that:
according to the flight case, when the flight case is used for transporting pets, the hand-screwed bolts 13 are rotated to be matched with the threaded ends of corresponding iron shaft 3 or inserting rods 4 to lock the iron shaft 3 and the inserting rods 4, so that a stability of connection between the case door 2 and the case body 1 is effectively improved, the case door 2 is avoided from being automatically opened during transportation, operation is easy and convenient, and when the hand-screwed bolts 13 are not tightened, the inserting rods 4 are operated through the protrusions 5 to realize quick opening and closing of the case door 2.

The inserting hole with the conical flareout in the connecting seat 10 can guide the end of the inserting rod 4 during insertion of the inserting rod 4, so that it is more convenient to insert the inserting rod 4 into corresponding inserting hole.

Although the present invention is described in detail with reference to the embodiments above, those skilled in the art may still modify the technical solutions recorded in the embodiments above, or make equivalent substitutions to some of the technical features. Any modification, equivalent substitution and improvement made within the spirit and principle of the present invention should fall within the scope of protection of the present invention.

I claim:

1. A high-reliability flight case with an auxiliary locking function, comprising a case body (1) and a case door (2) located at an opening of the case body (1), an outer wall of the case door (2) is fixedly connected with an iron shaft (3), the outer wall of the case door (2) is fixedly connected with a box body (6), the box body (6) is symmetrically connected with two inserting rods (4) through a rebound mechanism, connecting seats (10) are integrally formed at positions corresponding to ends of the iron shaft (3) and ends of the inserting rods (4) on an outer wall of an opening of the case body (1), inserting holes matched with the iron shaft (3) and the inserting rods (4) are formed in the connecting seats (10) in a penetrating mode, one end of the inserting hole oriented to the case door (2) is set as a conical flareout, an outer wall of the connecting seat (10) is clamped with an adapter seat (11), a hand-screwed nut (13) is movably arranged on the adapter seat (11) in a penetrating mode, two ends of the iron shaft (3) and one ends of the inserting rods (4) far away from the box body (6) are all provided with an external thread, and the threaded ends of the iron shaft (3) and the inserting rods (4) are located in corresponding connecting seats (10) and matched with the hand-screwed nuts (13).

2. The high-reliability flight case with the auxiliary locking function according to claim 1, wherein the rebound mechanism comprises a spring (8) located in the box body (6), two ends of the spring (8) are both provided with a connecting plate (7), and one end of the inserting rod (4) penetrates through the outer wall of the box body (6) to be fixedly connected with corresponding connecting plate (7).

3. The high-reliability flight case with the auxiliary locking function according to claim 1, wherein an outer wall of the inserting rod (4) close to the box body (6) is bent to form a protrusion (5), the outer wall of the inserting rod (4) is slidably sleeved with a guide sleeve (9), and the guide sleeve (9) is fixedly connected with the case door (2).

4. The high-reliability flight case with the auxiliary locking function according to claim 1, wherein an outer wall of the adapter seat (11) is provided with a plurality of buckles (12), and matched clamping grooves are arranged at positions on the outer wall of the connecting seat (10) corresponding to the buckles (12).

5. The high-reliability flight case with the auxiliary locking function according to claim 1, wherein a conical boss is integrally formed on an outer wall of one end of the hand-screwed nut (13) located in the adapter seat (11), a through hole matched with the hand-screwed nut (13) is formed in the adapter seat (11), and an outer diameter of the conical boss close to an end with the through hole is larger than an aperture of the through hole.

* * * * *